United States Patent [19]

Sheehan et al.

[11] Patent Number: 5,349,731
[45] Date of Patent: Sep. 27, 1994

[54] TEMPERATURE COMPENSATED AND SHOCK RESISTANT MACHINE TOOL

[75] Inventors: Terrence M. Sheehan, Elmira; Jyoti Mukherjee, Elmira Heights; Raymond C. Cady, Horseheads, all of N.Y.; Gary L. Comstock, Gillett, Pa.; Daniel P. Soroka, Horseheads, N.Y.

[73] Assignee: Hardinge Brothers, Inc., Elmira, N.Y.

[21] Appl. No.: 696,843

[22] Filed: May 7, 1991

[51] Int. Cl.$^5$ .............................................. B23Q 5/22
[52] U.S. Cl. ................................... 29/27 R; 74/89.15; 74/424.8 R; 82/141; 82/900; 384/10; 384/45; 409/238
[58] Field of Search ................. 29/27 R, 50, 54, 27 C; 409/135, 136, 137, 238; 82/138, 141, 900; 74/89.15, 424.8 R; 384/9, 10, 45

[56] References Cited

U.S. PATENT DOCUMENTS

| | | | |
|---|---|---|---|
| 989,002 | 4/1911 | Hanson | 408/61 |
| 1,119,669 | 12/1914 | Wigness | 82/900 X |
| 1,382,433 | 6/1921 | McCarty . | |
| 2,273,698 | 2/1942 | Ellis . | |
| 2,425,903 | 3/1944 | Vancil et al. . | |
| 2,522,695 | 9/1950 | Walter . | |
| 2,675,276 | 4/1954 | Daugherty . | |
| 2,859,643 | 11/1958 | McIver . | |
| 3,104,826 | 9/1959 | Morris . | |
| 3,113,488 | 12/1963 | Davenport | 82/900 X |
| 3,113,807 | 10/1961 | Polidor . | |
| 3,142,120 | 7/1964 | Mottu | 82/900 X |
| 3,198,588 | 8/1965 | Cashman et al. . | |
| 3,221,605 | 12/1965 | Hemmerle, Jr. | 82/900 X |
| 3,236,124 | 2/1966 | Rhoades | 82/900 X |
| 3,303,731 | 8/1965 | Zawistowski . | |
| 3,347,116 | 10/1967 | Anderson et al. | 82/141 X |
| 3,491,277 | 1/1970 | Brainard | 82/900 X |
| 4,068,906 | 1/1978 | Diir . | |
| 4,100,826 | 7/1978 | Takahashi | 82/138 |
| 4,334,717 | 6/1982 | Polidor . | |
| 4,530,626 | 7/1985 | Sabbioni . | |
| 4,684,266 | 8/1987 | Furmanek et al. | 384/37 |
| 4,778,315 | 10/1988 | Duffy et al. | 409/136 |
| 4,797,008 | 1/1989 | Helbig et al. | 384/49 |
| 4,923,311 | 7/1990 | Gibbs et al. | 384/49 |
| 4,941,758 | 7/1990 | Osawa | 384/40 |

FOREIGN PATENT DOCUMENTS

| | | | |
|---|---|---|---|
| 1152870 | 8/1963 | Fed. Rep. of Germany | 82/141 |
| 47-29224 | 8/1972 | Japan | 82/141 |

Primary Examiner—Z. R. Bilinsky
Attorney, Agent, or Firm—Cushman, Darby & Cushman

[57] ABSTRACT

A machine tool comprises a frame; a work holder operably associated with the frame; at least one carriage disposed on the frame and movable along an axis; at least one tool disposed on the carriage for operating on a work piece disposed in the work holder; at least one nozzle assembly disposed on the carriage for directing at least one fluid stream to the work piece and the tool; a screw-nut drive operably associated with the carriage, the drive including a lead screw; a device for stretching the lead screw for compensating for thermal growth of the screw during operation; and a resilient strip operably disposed between the frame and the carriage for absorbing impact forces.

8 Claims, 6 Drawing Sheets

TEMPERATURE COMPENSATED AND SHOCK RESISTANT MACHINE TOOL

FIELD OF THE INVENTION

The present invention relates generally to a machine tool and specifically to a highly accurate gang tool numerically controlled machine having airblast and coolant system and thermal compensated screw drives, and shock resistant guideways.

BACKGROUND OF THE INVENTION

In a numerically controlled machine, a plurality of tools are typically carried by a carriage and are brought in a preselected sequence to a work piece to make a specific part. Each individual tool must be cooled and any chip build up must be removed from the part during the machining operation. A solution to this problem included mounting the chip removal and lubricating device on a fixed wall or structure adjacent the spindle of the machine. In this manner, the relative position of the work piece with respect to the device is always fixed, regardless of the position of the machine carriage. However, the chip and lubricating device so positioned may obscure an operator's field of view when inspecting the part, thereby necessitating the frequent moving of the device in order to clear his field of view. There is therefore a need for a chip removal and tool lubricating device wherein the relative position of the device with the tool and the part being machined remains substantially constant without unduly obstructing the view of the operator.

A machine tool designed for extremely accurate machining operations must compensate for errors resulting from thermal growth of the machine components. Screw-nut drives are generally used in machine tools such as a Lathe and the like and are used to accurately position a work piece supporting member or a tool. During operation of the machine tool, the resultant heat produced causes the lead screw to expand, thereby introducing errors into the system. In a situation where both ends of the lead screw are fixed, the thermal expansion will cause the screw to sag or buckle up, fooling the positioning system of the machine that tracks the number of rotations of the screw to determine the position of the carriage. Additionally, stresses are introduced at each end of the screw that could cause premature failure of the screw. There is therefore a need to provide a screw-nut drive that is compensated for the expected thermal growth of the lead screw during normal operations.

In a machine tool with a movable carriage or table, the movement of the table is typically accomplished on accurately machined close tolerance guideways and bearing assemblies. A numerically controlled machine is programmed by its operator to provide specific machining operations for a specific part. After programming, the machine then goes through its various paces automatically, without any intervention from the operator. If the operator had made a mistake in programming, the machine could conceivably crash, where the cutting tool or the movable carriage may jam into the part being machined or into the machine spindle, generating large shock forces that could damage the highly machined guideways. When a crash occurs, the machine is inspected for damages. Typically, the guideways will have indentations from the bearings, requiring rebuilding or replacement. The machine is then taken out of production while it is being repaired, thereby causing revenue loss. There is therefore a need to provide shock resistant guideways that will be able to absorb the shock forces during a crash without any damage, thereby avoiding an expensive downtime.

OBJECTS AND SUMMARY OF THE INVENTION

It is an object of the present invention to provide an airblast and coolant device that maintains its relative position with a cutting tool disposed on a carriage or with a work piece disposed in a work holder.

It is another object of the present invention to provide an airblast and coolant device that provide cost reduction through reduced cycle time, because chips are removed from the work holding device and a cleaner gripping surface is available to receive each part.

It is another object of the present invention to provide a machine tool that has temperature compensated screw-nut drives.

It is still another object of the present invention to provide a machine tool with a screw-nut drive wherein the screw is pre-stretched to its normal operating thermal growth length.

It is yet another object of the present invention to provide a machine tool with guideways that can resist the shocks generated during a crash.

It is still another object of the present invention to provide a machine tool that avoids the replacement or rebuilding of the machine guideways after an accidental crash.

It is another object of the present invention to provide a guideway system that has a low cross-sectional height for a compact, low profile stiff and stable assembly.

It is still another object of the present invention to provide a guideway system that has high positioning accuracy, excellent rigidity, and high speed efficiency that assures both parts machining precision and longer tool life.

It is yet another object of the present invention to provide a guideway system that provides substantial energy savings in power consumption.

It is another object of the present invention to provide a guideway system that produces less friction, less heat and less thermal growth compared to friction slides, thereby resulting in faster traverse rates for reduced cycle time, less machine wear, longer tool life and high positioning accuracy for close tolerance machining and overall machining consistency.

These and other objects of the present invention will become apparent from the following detailed description.

DETAILED DESCRIPTION OF THE INVENTION

Figure 1:
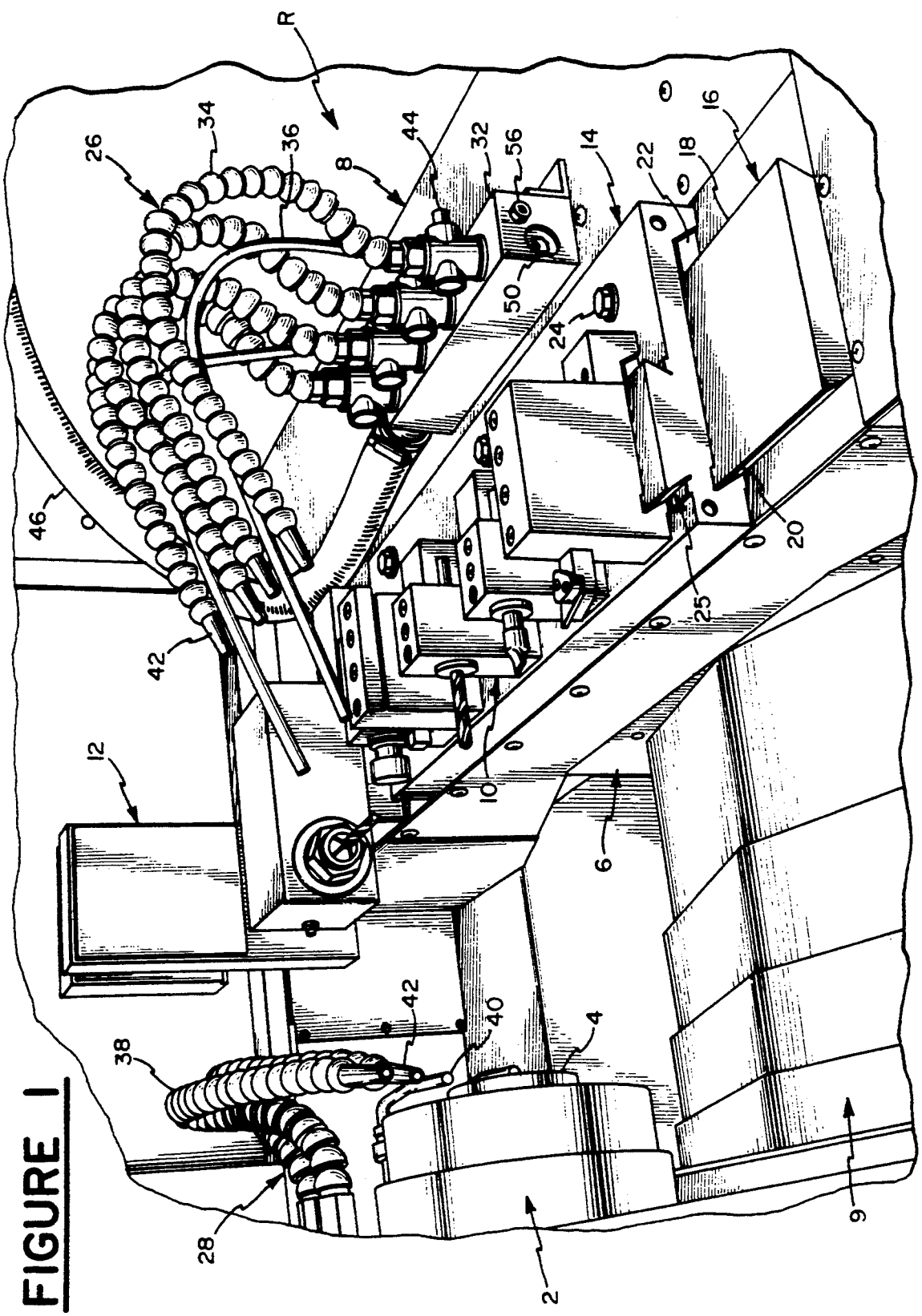
FIG. 1 is a fragmentary front perspective view of a machine tool according to the present invention.
Figure 3:
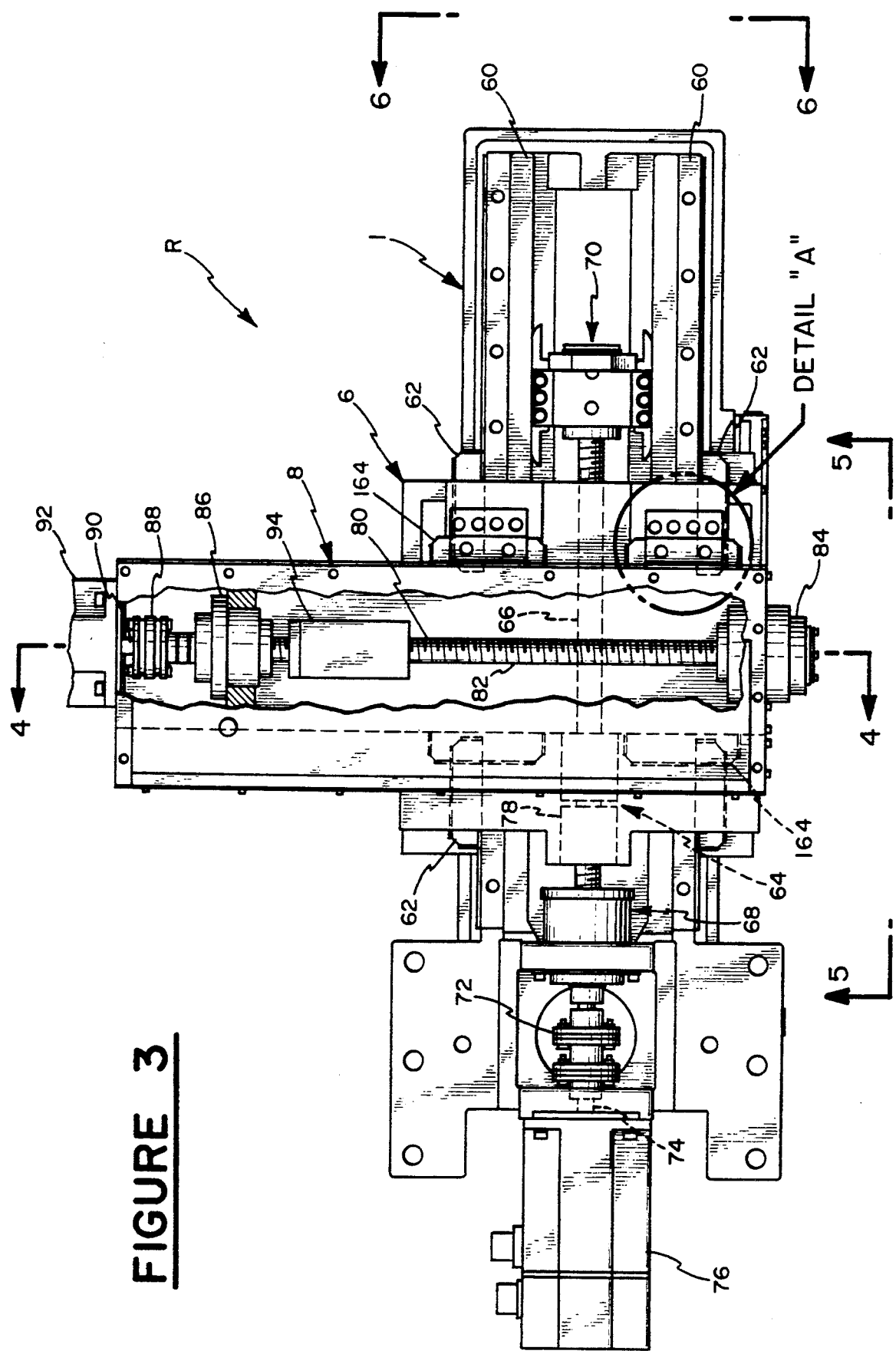
FIG. 3 is a top plan view, with portions broken away and in cross-section, of the carriage and guideways of the machine tool in FIG. 1.
Figure 5:
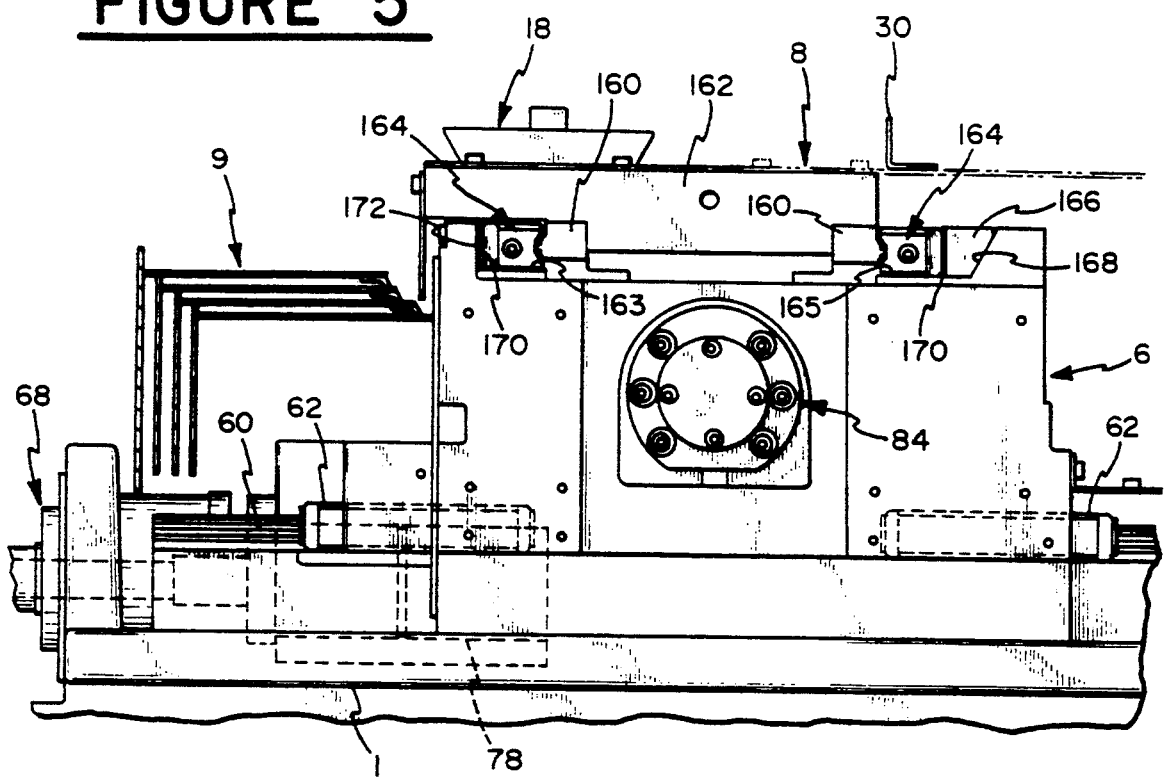
FIG. 5 is a fragmentary front elevational view of the machine in FIG. 3 viewed in the direction of line 5—5.

An embodiment of the present invention is disclosed as a numerically controlled lathe R, as best shown in FIG. 1. The lathe R comprises a bed frame 1 (shown in FIG. 3), a spindle 2 operably secured to the bed frame, a work holder 4 operably associated with the spindle 2, a Z-axis carriage 6 disposed on the bed frame 1 and movable along the Z-axis parallel to the axis of rotation of the spindle 2, and a X-axis carriage 8 movable along the X-axis and operably associated with the Z-axis carriage 6. A telescoping way cover 9 is operably associated with the Z-axis carriage 6 and the bedframe 1. Movement of the carriage 6 causes the way cover 9 to either retract or expand, as best shown in FIG. 5.

A plurality of static tools 10 and a live tool 12 are shown disposed on the X-axis carriage 8. Movement of the Z-axis carriage 6 and X-axis carriage 8 permit each of the tools 10 and 12 to be selectively brought to a work piece 13 (shown in FIG. 9) that is secured in the work holder 4. The static tools 10 are mounted on a top plate 14 that is removably secured to the X-axis carriage 8 by means of a dovetail joint 16 that comprises a dovetail tenon 18 disposed on the X-axis carriage 8 and a cooperating dovetail mortise 20 disposed on the underside of the top plate 14, as best shown in FIG. 1. A gib 22, cooperating with a plurality of bolts 24, clamps the top plate 14 to the dovetail tenon 18.

The static tools 10 are removably secured to the top plate 14 by means of a dovetail joint 25 similar to the dovetail joint 16.

The live tool 12 is removably secured to the dovetail tenon 18 by means of dovetail mortise clamp (not shown) that is similar to the dovetail mortise 20.

Figure 9:
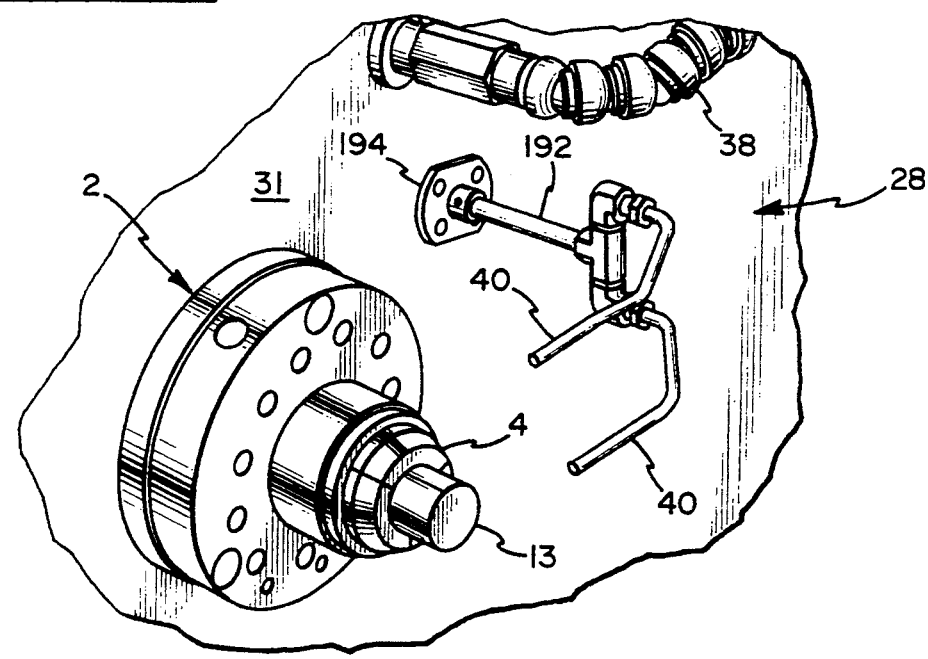
FIG. 9 is a left side framentary perspective view of FIG. 1 taken in the direction of the machine spindle.
Figure 2:
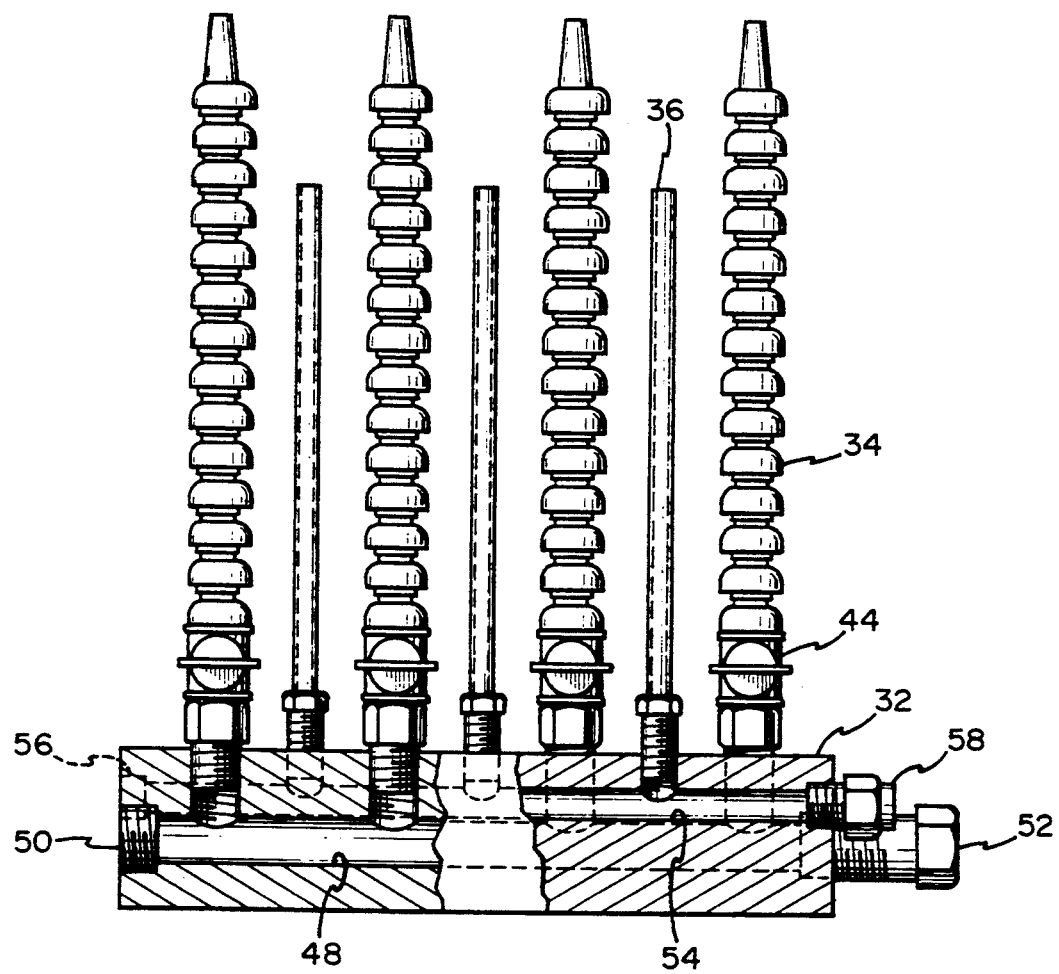
FIG. 2 is a side elevational view of an airblast and coolant device, with portions shown broken away and in cross-section.

An airblast and coolant facility 26 is secured to the X-axis carriage 8 by means of bracket 30, as best shown in FIG. 1. An airblast and coolant facility 28 is secured to a head wall 31 disposed behind the spindle 2, as best shown in FIG. 9. The airblast/coolant facility 26 has a manifold 32 that supplies coolant fluid to nozzle assemblies 34 and pressurized air to airblast tubes 36. The airblast/coolant facility 28 has nozzle assemblies 38 and airblast tubes 40. Each of the nozzle assemblies 34 and 38 has a nozzle 42 that can be directed to the work piece 13 or to one of the tools 10 and 12. Each of the nozzle assemblies 34 and 38 is made of a plurality of interlocking swivel joints that allow for a wide range of adjustments. Each of the airblast tubes 36 and 40 is preferably made of a rigid but bendable material, such as copper, such that it can be bent to direct the air stream in the desired direction and will have sufficient rigidity against the air flow to remain in the desired position.

Each of the nozzle assemblies 34 have a manually operable valve 44 for selectively controlling the flow of the coolant fluid therethrough.

A flexible hose 46 connects to the manifold 32 for supplying coolant fluid to the nozzle assemblies 34 from a reservoir (not shown). The nozzle assemblies 38 are supplied by coolant fluid from the same reservoir. Another hose (not shown) connects to the manifold 32 to supply compressed air to the airblast tubes 36. Preferably the same source of compressed air is connected to the airblast tubes 40.

The manifold 32 has an internal passageway 48 that is blocked off at one end with a plug 50 and has a connector 52 at the other end for connecting to the hose 46. The passageway 48 communicates with each of the nozzle assemblies 34 such that coolant supplied to the passageway 48 is then discharged through each of the nozzle assemblies 34, provided that respective valve 44 is open.

The manifold 32 has another passageway 54 that is parallel to the passageway 48. The passageway 54 is blocked off at one end with plug 56 and has a connector 58 at its other end for connection to a compressed air source. The passageway 54 communicates with each of the airblast tubes 36 such that compressed air in the passageway 54 is distributed through each of the airblast tubes 36 and directed at the work piece 13 and/or tools 10 and 12.

The Z-axis carriage 6 is movable over the bed frame 1 through a pair of guideways 60 secured to the bed frame 1 and bearing assemblies 62 that are secured to the Z-axis carriage 6 and operably associated with the guideway 60. A screw-nut assembly 64 secured to the bed frame 1 and operably associated with the Z-axis carriage 6 provides the drive means for translating the Z-axis carriage 6 along the guideways 60. The screw-nut assembly 64 includes a lead screw 66 that is anchored at each of its ends by anchor assemblies 68 and 70 that are rigidly secured to the bed frame 1, as best shown in FIG. 1. A coupling 72 connects one end of the lead screw 64 to an output shaft 74 of a motor 76. A ball-nut assembly 78 secured to the Z-axis carriage 6 and operably associated with the lead screw 64 causes the Z-axis carriage 6 to move along the guideways 60 when the lead screw 64 is rotated by the motor 76.

A screw-nut assembly 80 that is secured to the Z-axis carriage 6 and operably associated with the X-axis carriage 8 provides the means for translating the X-axis carriage 8 along the X-axis direction transverse to the direction of motion of the Z-axis carriage 6. The screw-nut assembly 80 has a lead screw 82 which is anchored to tile Z-axis carriage 6 at both of its ends with anchor assemblies 84 and 86. A coupling 88 connects one end of the lead screw 82 to an output shaft 90 of a motor 92. A ball-nut assembly 94 secured to the X-axis carriage 8 and operably associated with the lead screw 82 causes the X-axis carriage 8 to translate along the X-axis direction when the lead screw 82 is rotated by the motor 92.

The anchor assemblies 68 and 86 are similar in construction. Likewise, the anchor assemblies 70 and 84 are also similar in construction. Therefore, only the anchor assemblies 84 and 86 will be described in detail below.

Figure 4:
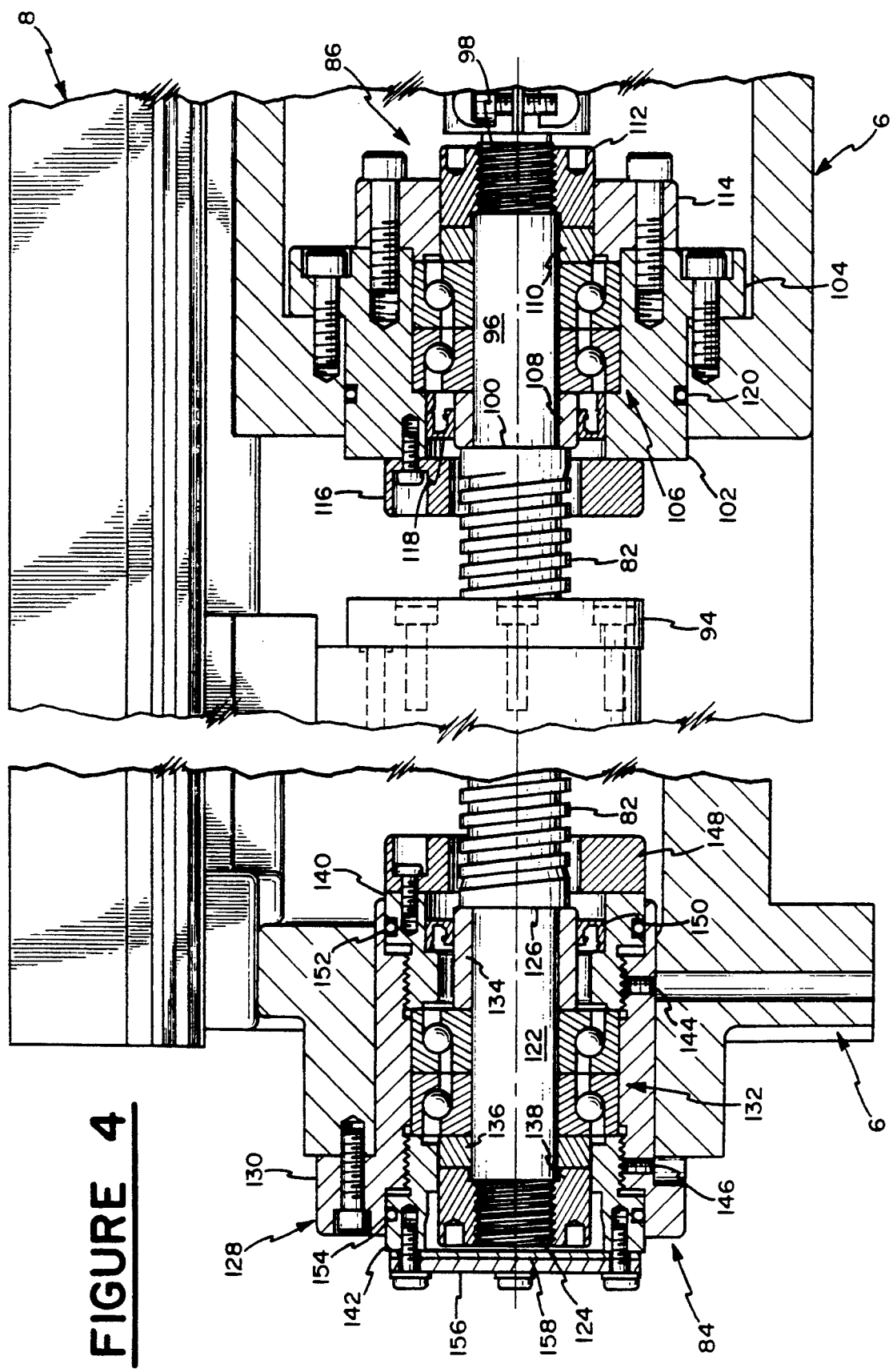
FIG. 4 is an enlarged fragmentary cross-sectional view taken along line 4—4 in FIG. 3.

Referring to FIG. 4, the end of the lead screw 82 associated with the anchor assembly 86 has a smooth portion 96 and a threaded end portion 98. The portions 96 and 98 have the same overall diameter, which is smaller than the overall diameter of the rest of the lead screw 82, thereby creating a shoulder 100, as best shown in FIG. 4. The anchor assembly 86 has an outer bearing support or housing 102 with a radially outwardly extending flange 104 that is secured to the Z-Axis carriage 6, as best shown in FIG. 4. Bearing assemblies 106 are disposed between the smooth portion 96 and the bearing support 102 in a conventional pressed-fit manner. Spacers 108 and 110 are disposed respectively in each side of the bearing assemblies 106 to thereby position the bearing assemblies in the intermediate portion of the smooth portion 96. The spacer 108 engages the shoulder 100. A bearing nut 112 cooperates with the threaded portion 98 and locks the bearing assemblies against the shoulder 100. A bearing retainer 114 locks the bearing assemblies 106 within the bearing support 102, as best shown in FIG. 4. A bumper 116 is secured to the bearing support 102 opposite the bearing container 114 to provide a replaceable wearing surface against the ball-nut assembly 94. A grease seal 118 prevents debris and contaminants from getting into the bearing assemblies 106. A seal 120 disposed between the Z-axis carriage 6 and the bearing support 102 prevents debris and contaminants from getting into the coupling 88 or into the bearing assemblies 106.

The anchor assembly 84 will now be described in detail. The other end of the lead screw 82 has a smooth portion 122 and a threaded end portion 124. The overall outside diameter of the other end of the lead screw 82 is smaller than the overall diameter of the lead 82, thereby creating a radially outwardly extending shoulder 126. A bearing support 128 has a radially outwardly extending flange 130 that is secured to the Z-axis carriage 6, as best shown in FIG. 4. Bearing assemblies 132 are disposed within the bearing support or housing 128 and around the smooth portion 122 in a conventional pressed-fit manner. Spacers 134 and 136 are disposed respectively on each side of the bearing assemblies 132. The spacer 134 engages the shoulder 126, providing a stop for the bearing assemblies 132. A bearing nut 138 locks the bearing assembly 132 in an intermediate portion of the smooth portion 122, as best shown in FIG. 4. The bearing nut 138 cooperates with the threaded end portion 124. Bearing retainer nuts 140 and 142 are threadedly secured into respective ends of the bearing support 128. The bearing retainer nuts 140 and 142 each engages the bearing assemblies 132 from opposite directions, as best shown in FIG. 4. Set screws 144 and 146 lock the bearing retainer nuts 140 and 142 in place, respectively. A bumper 148 is secured to the bearing retainer nut 140 to provide a wearing surface against the ball-nut assembly 94. A grease seal 150 is disposed between the bearing retainer nut 140 and a spacer 134 to prevent debris and contaminants from fouling up the bearing assemblies 132. Seals 152 and 154 are disposed between the bearing support 128 and the bearing retainer nuts 140 and 142, respectively, that in cooperation with a grease seal 150, provide a complete seal to the bearing assemblies 132. A cover 156 with a cooperating seal 158 further seals the bearing assemblies 132 from any possible contamination.

Pre-stretching of the lead screws 66 and 82 are accomplished by the anchor assemblies 70 and 84, respectively, in cooperation with corresponding anchor assemblies 68 and 86. The lead screws 66 and 82 are pre-stretched to their normal thermal operating lengths to insure precision in positioning the respective Z- and X-axis carriages 6 and 8 when the lead screws 66 and 82 will have elongated during operation due to temperature rise. Pre-stretching also insures that stresses are not built up at the anchor assemblies 68, 70, 84 and 86 during operation. These stresses can cause early failure to the anchor assemblies or to the lead screws themselves. The pre-stretching operation will be discussed below.

The X-axis carriage 8 moves along a pair of guideways 160 that are secured to a table 162 and are operably associated with respective bearing assemblies 164 that are secured to the Z-axis carriage 8 in opposite recesses 163 and 165, as best shown in FIG. 5. The dovetail tenon 18 is advantageously disposed above one of the guideways 160 for added rigidity. A trapezoidal wedge 166 provides a preload on the bearing assemblies 164 and urges the bearing assemblies 164 against the guideways 160. The wedge 166 cooperates with a complementary inclined surface 168 in the recess 165 in the Z-axis carriage 6. A resilient strip 170 is disposed between each of the bearing assemblies 164 and the respective wedge 166 or a shoulder 172 in the recess 163 in the Z-axis carriage 6. The strip 170 is coextensive with the engaging side of the respective bearing assembly 164.

Figure 6:
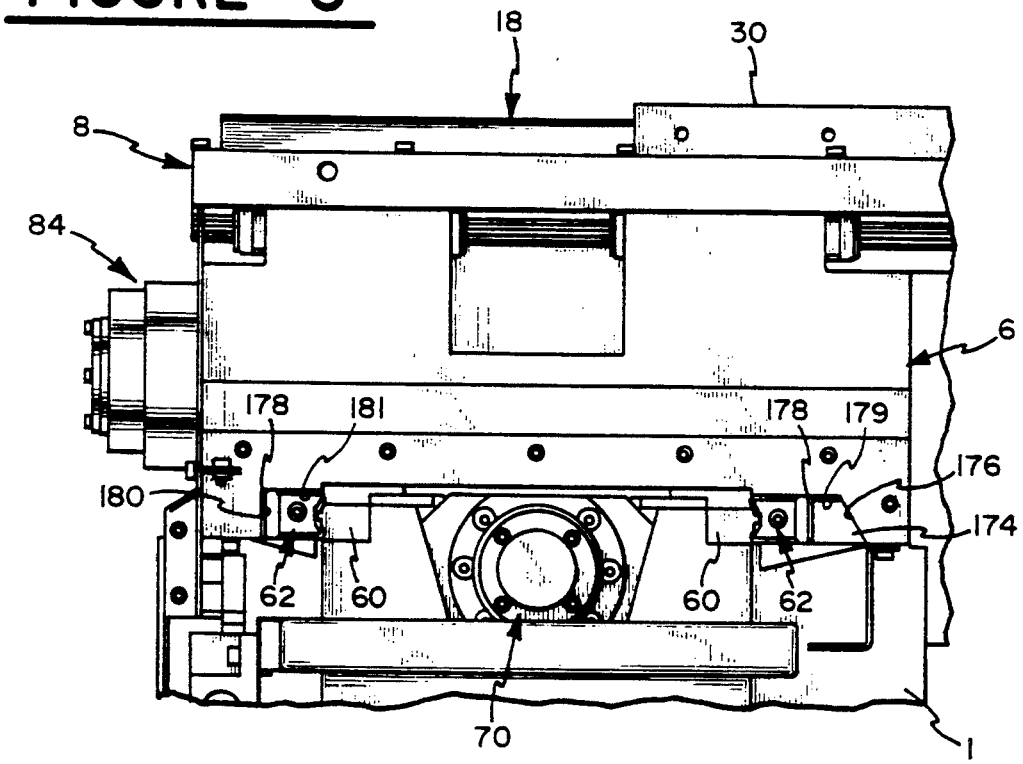
FIG. 6 is fragmentary side elevational view of the machine in FIG. 3 viewed in the direction of line 6—6.

Referring to FIG. 6, the bearing assemblies 62 are preloaded and urged against the linear guideways 60 by means of respective wedges 174 that cooperate with respective complementary inclined surfaces 176 or a shoulders 180 in respective recesses 179 and 181 in the Z-axis carriage 6. A resilient strip 178 is disposed between respective bearing assemblies 62 and the wedge 176 or the shoulder 180, as best shown in FIG. 6. The strip 17g is coextensive with the engaging side of the respective bearing assembly 62.

Figure 7:
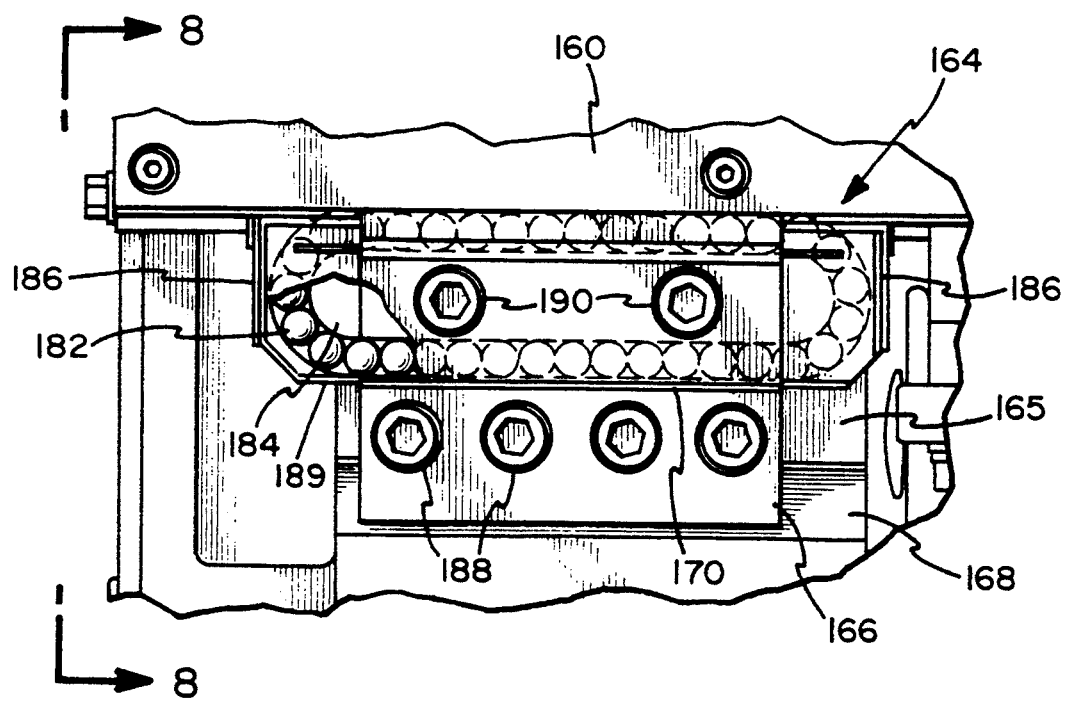
FIG. 7 is an enlarged top plan view of Detail A in FIG. 3.
Figure 8:
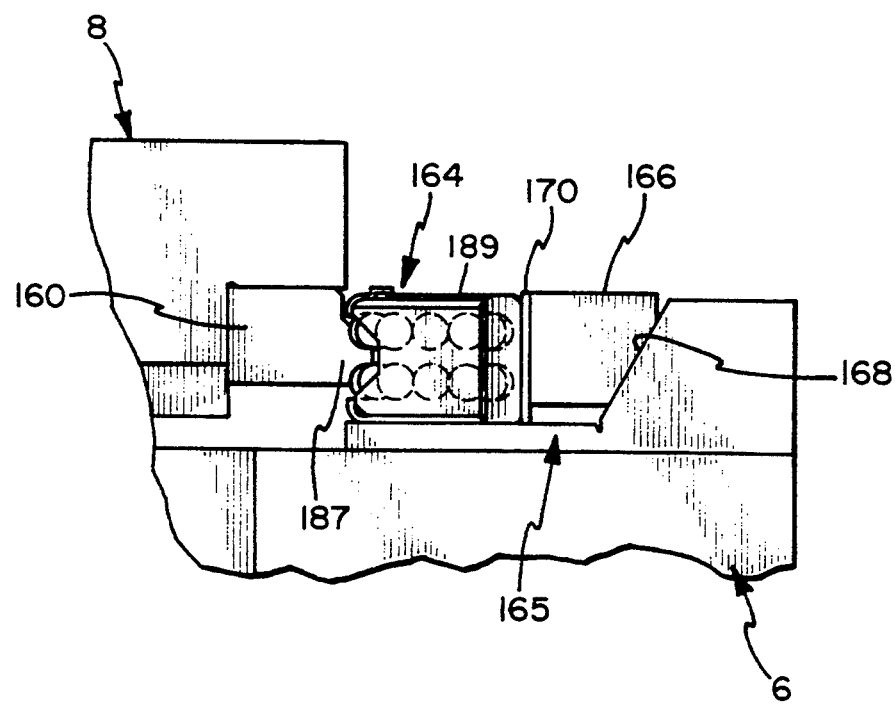
FIG. 8 is a front elevational view viewed along line 8—8 in FIG. 7.

Each of the bearing assemblies 62 and 164 has two rows of balls 182 that are held and circulated by means of a retainer 184 and end plates 186, as best shown in FIGS. 7 and 8. The bearing assemblies 62 and 64 each has a housing 189. Each of the guideways 60 and 160 has an outward trapezoidal projection 187 throughout its length that is disposed between the two rows of balls 182, as best shown in FIG. 8. A plurality socket head screws 188 secure the wedge 166 to the Z-axis carriage 6. Similarly, a pair of socket head screws 190 secure each of the bearing assemblies 164 to the Z-axis carriage 6.

The resilient strips 170 and 178 are preferably made of TURCITE (a registered trademark of W. S. Shamban & Company). TURCITE is compatible with a number of water soluble cutting fluids, oils and other fluids that are normally encountered in a machining operation. A person of ordinary skill in the art will understand that other similar materials may be used for the inserts 170 and 178. TURCITE is available from Bearing Division, 711 Mitchell Road, Newbury Park, Calif.

The resilient strips 170 and 178 provide a cushion during a crash situation. Without the cushion, birnelling damage on the guideways 60 and 160 is possible, causing a time consuming and expensive repair job. With the use of the resilient strips 170 and 178, damage is minimized or avoided during a crash, since the strips 170 and 178 take up the crash forces.

Each groups of the bearing assemblies 62 and 164 are preloaded by torquing the respective screws 188 and 190 in a preselected sequence.

OPERATION

When the lathe R is machining a part, each of the nozzles 42 is directed to respective tools 10 and 12 and/or the work piece 13 held in the work holder 4. The airblast tubes 36 and 40 are similarly directed to the work piece 13, the tools 10 and 12 and the work holder 4 so that any chip accumulation is minimized. Due to the different mounting positions of the airblast and coolant facilities 26 and 28, the various combinations of directions of flow for the coolant fluid and the air blast can be advantageously optimized.

The airblast tubes 40 is adjustable from the head wall 31 by means of an air tube 192 that is slidable through a flange 114 and selectively positionable from the head wall 31 by means of a set screw in the flange 194. The air tubes 40 can also be rotated about the flange 194 for optimum blast angle to clean the part 13 and the work holder 4. The nozzle assembly 38 and air blast tubes 40 are preferably disposed behind the spindle 2 and away from the operator, so that the view of the operator is not obstructed.

The nozzle assemblies 34 and the air blast tubes 36 are advantageously disposed on the X-axis carriage 8 so that their positions relative to the tools 10 and 12 remain constant. In this manner, even when the tools 10 and 12 are being drawn away from the work piece 13, the coolant fluid continues to cool down the tools 10 and 12 and the airblast tubes continue to clear the tools of any accumulated chips. Additionally, mounting the nozzle assemblies 34 and the air tubes 36 on the X-axis carriage 8 advantageously provides the operator with an unobstructed view when the carriage 8 is drawn away from the work piece 13, without any manual bending or otherwise handling of the nozzle assemblies 34 and the airblast tubes 36.

Each of the lead screws 66 and 82 is advantageously pre-stretched to compensate for heat growth during operation. Since the pre-stretching operation for the lead screw 66 is similar to the that of the lead screw 82, the following description will only be provided for the lead screw 82. The stretching operation for the lead screw 66 is performed at the anchor assembly 70, which is similar in construction to the anchor assembly 84.

The anchor assemblies 84 and 86 are assembled and secured in place. The pre-stretching is accomplished with the anchor assembly 84. The bearing retainer nut 142 is backed off a sufficient distance away from the bearing assemblies 132 to provide a gap or space between itself and the bearing assemblies 132. The bearing retainer nut 140 is then torqued inwardly into the bearing support 128, causing the bearing nut 140 to push against the bearing assemblies 132. Since the bearing support 128 is secured to the Z-axis carriage 6 by the flange 130 and a space exists between the other side of the bearing assemblies 132 and the bearing retainer nut 142, the lead screw is elongated. Torquing of the bearing retainer nut 140 is continued until the end portion 124 of the lead screw 82 has advanced a certain amount which is substantially equal to the thermal elongation of the lead screw 82 had the end portion 124 been free to move.

When the required pre-stretch is obtained, the bearing retainer nut 142 is then torqued to engage the bearing assemblies 132. The set screws 144 and 146 are then tightened to lock the respective bearing retainer nuts 140 and 142 in place. The bumper 148 and the cover 156 are then secured in place.

A person skilled in the art will understand that with the lead screws 66 and 82 being pre-stretched, stress at the anchor assemblies 84 and 86 is minimize during operation, due to the elongation of the lead screw 82 resulting from thermal growth. Additionally, the lead screw 66 and 82 are far more accurate, since deflection or bowing resulting from thermal expansion is eliminated where the lead screws 66 and 82 have not been pre-stretched.

When a crash occurs, the guideways 60 and 160 are inspected for damage. With the use of the strips 170 and 178, occurrence of damage is normally avoided. The strips 170 and 178 are then replaced.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

We claim:

1. A machine tool, comprising:
   a) a support;
   b) a screw having first and second ends;
   c) first and second anchors including respective first and second housings for axially securing said first and second ends to said support, respectively;
   d) a carriage mounted on said support and movable between said ends of said screw;
   e) a nut operably secured to said screw and said carriage such that rotation of said screw causes translational movement of said carriage along said support;
   f) said first anchor including a stop operably secured to said first end;
   g) a first member operably secured to said first anchor housing and engaging said stop said first member being disposed between said stop and said second end, said first member being selectively axially positionable relative to said first anchor housing
   h) whereby axial movement of said first member against said stop and away from said second end elongates said first end by an amount to compensate for thermal growth of said screw during operation.

2. A machine tool as in claim 1, wherein:
   a) said stop includes a first sleeve threadedly secured to said first end; and
   b) a bearing assembly disposed inwardly of said first sleeve and operably associated therewith.

3. A machine tool as in claim 2, wherein:
   a) said first member is a second sleeve threadedly secured to said first anchor housing and operably associated with said bearing assembly.

4. A machine tool as in claim 2, wherein:
   a) said first anchor housing is a bearing block for radially supporting said bearing assembly; and
   b) said bearing block includes an outwardly radially extending flange operably secured to said support.

5. A machine tool as in claim 2, and further comprising:
   a) a second member disposed opposite said first member and threadedly secured to said first anchor housing ; and
   b) said second member is engaged with said bearing assembly.

6. A machine tool as in claim 1, and further comprising:
   a) first and second guide rails disposed parallel to each other and operably associated with said carriage; and
   b) resilient member disposed between said guide rails and said support for absorbing impact forces, thereby minimizing any damage to said guide rails and said bearing assemblies.

7. A machine tool as in claim 6, and further comprising:
   a) bearing assemblies operably associated with said guide rails and said support;
   b) said resilient member is disposed between said bearing assemblies and said support.

8. A machine tool as in claim 6, wherein:
   a) said resilient member comprises a layer of plastic material.

* * * * *